United States Patent [19]

Bigo et al.

[11] 4,262,360

[45] Apr. 14, 1981

[54] METHOD AND DEVICE FOR DETECTING A PSEUDO-RANDOM SEQUENCE OF CARRIER PHASE CHANGES OF 0° AND 180° IN A DATA RECEIVER

[75] Inventors: Firmin Bigo, LaGaude; Francois Caron, Cagnes, both of France

[73] Assignee: International Business Machines Corp., Armonk, N.Y.

[21] Appl. No.: 102,297

[22] Filed: Dec. 10, 1979

[30] Foreign Application Priority Data

Dec. 20, 1978 [FR] France .................................. 78 36580

[51] Int. Cl.³ ........................ H04L 5/12; H04L 23/02
[52] U.S. Cl. ...................................... 375/77; 370/20;
375/39; 375/43; 375/50; 375/15
[58] Field of Search ...................... 370/12, 20; 328/72,
328/74, 109, 155; 358/195; 364/485, 575;
375/39, 43, 50, 77, 86; 455/46, 202

[56] References Cited

U.S. PATENT DOCUMENTS

| | | | |
|---|---|---|---|
| 3,378,770 | 4/1968 | Daquet | 375/43 |
| 3,443,229 | 5/1969 | Becker | 370/20 |
| 4,004,237 | 1/1977 | Kratzer | 328/155 |

*Primary Examiner*—Benedict V. Safourek

*Attorney, Agent, or Firm*—John B. Frisone

[57] ABSTRACT

A method and device which, in a receiver forming part of a data transmission system using DSB-QC modulation and wherein the transmitter generates a first sequence of successive carrier phase changes of 180° taking place at the signaling rate 1/T followed by a second sequence of pseudo-random carrier phase changes of 0° and 180°, with the first of these being a 0° phase change, permit detecting the beginning of said second sequence. The received signal is filtered to extract therefrom its components at frequencies $f_1$ and $f_2$ defined as $$f_1 = f_c - \tfrac{1}{2}T \quad f_2 = f_c + \tfrac{1}{2}T$$

where $f_c$ is the carrier frequency.

The components at frequencies $f_1$ and $f_2$ are combined to generate a signal S of frequency 1/T. The beginning of said second sequence is determined by detecting the instant at which the energy of signal S drops below its average value. According to another aspect of the invention, the beginning of said second sequence is determined by detecting the instant at which the amplitude of the in-phase component, sampled at the signaling rate, of signal S decreases significantly.

10 Claims, 4 Drawing Figures

METHOD AND DEVICE FOR DETECTING A PSEUDO-RANDOM SEQUENCE OF CARRIER PHASE CHANGES OF 0° AND 180° IN A DATA RECEIVER

DESCRIPTION

1. Technical Field

This invention relates to specific-sequence detectors used in the receivers of data transmission systems employing doubled sideband-quadrature carrier (DSB-QC) modulation and in which, before transmitting any data, a first sequence of successive carrier phase changes of 180° taking place at the signaling rate is generated, this being followed by a second sequence of pseudo-random phase changes of 0° and 180° of the same carrier. More particularly, the invention relates to a method and a device for detecting the beginning of said second sequence. The invention is especially useful for detecting the equalizer training sequence prescribed by CCITT Recommendations V27 bis and V27 ter.

The term DSB-QC modulation refers to a class of modulation techniques that includes phase shift keying, amplitude phase shift keying and quadrature amplitude modulation.

2. Background Art

In those data transmission systems which use DSB-QC modulation, the sequence of bits to be transmitted is first divided into groups of Q bits and each of these groups is made to correspond to one of $2^Q$ complex numbers, or complex symbols. These symbols are then transmitted one at a time at instants which have a regular T-second spacing and are called signaling instants. Each symbol is transmitted by causing a given amplitude value of each of two quadrature carrier waves to corresond, respectively, to its real and imaginary parts. The two carriers are then combined and applied to the input of the transmission channel.

The function of the transmission channel is to provide at its output, connected to a data receiver, a signal as similar as possible to the input signal applied thereto. Mainly due to cost considerations, telephone lines are frequently used as transmission channels. However, such lines, while satisfactory for voice transmission purposes, become inadequate when used to transmit digital data at speeds equal to or higher than 4800 bits per second (bps) with a very low probability of error. Telephone lines cause impairments which affect the quality of the signals being transmitted and make it difficult to correctly detect the transmitted data. These impairments mainly include amplitude and phase distortions that create an interaction between successive signals. This interaction is known as intersymbol interference. In high speed data transmission systems, the receiver is generally provided with an automatic adaptive equalizer to minimize the effects of the intersymbol interference before detection of the data.

The type of adaptive equalizer that is the most widely used in those data transmission systems which employ DSB-QC modulation is the complex transversal equalizer, an exemplary embodiment of which is described in U.S. Pat. No. 3,947,768. In such an equalizer, each of the in-phase and quadrature components of the received signal is applied to the inputs of a pair of transversal filters whose outputs are then combined to generate the in-phase and quadrature components of the equalized signal. The coefficients of these filters, which are the coefficients of the equalizer, are automatically adjusted to meet a given performance criterion. Prior to the transmission of data, it is necessary that the values of the coefficients be as close as possible to optimum values. To this end, provision is made for a training period during which, before transmitting any data, a known training sequence is transmitted to the receiver, which compares the same with an identical, locally generated training sequence to obtain an error signal enabling coefficients of the equalizer to be initially adjusted to values that are as close as possible to said optimum values. The coefficients are then continuously adjusted during transmission of the data. In a receiver, the carrier detector, the AGC circuit, the clock recovery device and, lastly, the equalizer must all be properly conditioned before the transmission of data begins. Accordingly, provision has been made for a so-called turn-on period during which, before transmitting any data, a turn-on sequence is generated by the transmitter to condition all of the devices contained in the receiver. This turn-on sequence generally comprises a synchronizing sequence for properly conditioning the carrier detector, the AGC circuit and the clock recovery device, this being followed by an equalizer training sequence. It will thus be seen that a training sequence detector must be provided in the receiver to permit detecting the beginning of the training sequence and initiating the equalizer training process.

It its Recommendations V27 bis and V27 ter relating to the standardization of 4800 bps modems, the "Comite Consultatif International Telegraphique et Telephonique" (CCITT) prescribed the use of a turn-on sequence comprising a synchronizing sequence consisting of successive carrier phase changes of 180°, followed by an equalizer training sequence consisting of pseudo-random phase changes of 0° and 180° of the same carrier.

French patent application No. 77-15295 (French Pat. No. 2,352,456) describes two methods of detecting the synchronizing and training sequences and the transitions from the former to the latter wghere the synchronizing sequence exhibits a frequency spectrum comprising a line at the carrier frequency and two lines that are symmetrical about the first, and where the training sequence has a spectrum distributed all over the frequency band used for the transmission of data.

The first method described in said patent application involves the use of a bandpass filter such that the energy level at the output thereof is very low during the synchronizing sequence and increases significantly from the beginning of the training sequence. Thus, it may be possible, by measuring the energy level at the output of the filter, to detect the various sequences and the transitions from a sequence to another. However, this method is intended for a synchronization sequence that differs from that prescribed by CCITT Recommendations V27 bis and ter, which has no spectrum line at the carrier frequency. Also, as stated in the aforementioned patent application, one of the disadvantages of the above method is that the bandpass filter may damp the transients that occur when passing from a sequence to another and thus provide spurious indications.

The second method described in the above-mentioned French Pat. No. 2,352,456 requires the use of a filter for extracting from the received signal the component thereof at the carrier frequency, and a device serving to detect the zero crossings of that component. By measuring the time intervals between the zero crossings, one may detect the sequences and the transitions from a sequence to another. This second method is not applicable to the sequences prescribed by CCITT Recommendations V27 bis and ter since the recommended synchronizing sequence has no spectrum line at the carrier frequency.

OBJECTS AND SUMMARY OF THE INVENTION

The principal object of the present invention is to provide, in a data receiver using DSB-QC modulation, a method and a device for detecting the beginning of a random sequence of carrier phase changes of 0° and 180° when this sequence is preceded by a sequence of successive carrier phase changes of 180°, which are both accurate and insensitive to noise.

It is another object of the invention to provide a method and a device for detecting the beginning of the equalizer training sequence prescribed by CCITT Recommendations V27 bis and V27 ter.

These and other objects are generally attained in accordance with the present invention through the use of a method and a device which, in a receiver forming part of a data transmission system using DSB-QC modulation and wherein the transmitter generates a first sequence of successive carrier phase changes of 180° taking place at the signaling rate 1/T followed by a second sequence of pseudo-random carrier phase changes of 0° and 180°, with the first of these being a 0° phase change, permit detecting the beginning of said second sequence. The method of the present invention includes the steps of:

filtering the received signal to extract therefrom its components at frequencies $f_1$ and $f_2$ defined as $$f_1 = f_c - \tfrac{1}{2}T \quad f_2 = f_c + \tfrac{1}{2}T$$

where $f_c$ is the carrier frequency, combining said components at frequencies $f_1$ and $f_2$ to generate a signal S of frequency 1/T, measuring the energy of signal S, and detecting the time at which said energy drops below its average value, said time being indicative of the time at which said second sequence begins.

According to another aspect of the invention, the latter time is determined by detecting the instant at which the amplitude of the in-phase component, sampled at the signaling rate, of the signal S decreases significantly.

The invention also proposes various devices to implement the present method.

BRIEF DESCRIPTION OF THE DRAWINGS

The foregoing and other objects, features and advantages of the invention will be apparent from the following more particular description of a preferred embodiment of the invention, as illustrated in the accompanying drawings.

DETAILED DESCRIPTION OF THE INVENTION

Generally, this invention relates to a method and a device for detecting the beginning of a sequence of pseudo-random carrier phase changes of 0° and 180° when it is preceded by a sequence of successive carrier phase changes of 180°. For clarity, and without in any way intending to limit the scope of the invention, a description will be given below of the manner in which the invention can be used to detect the equalizer training sequence prescribed by CCITT Recommendations V27 bis and V27 ter.

Figure 1:
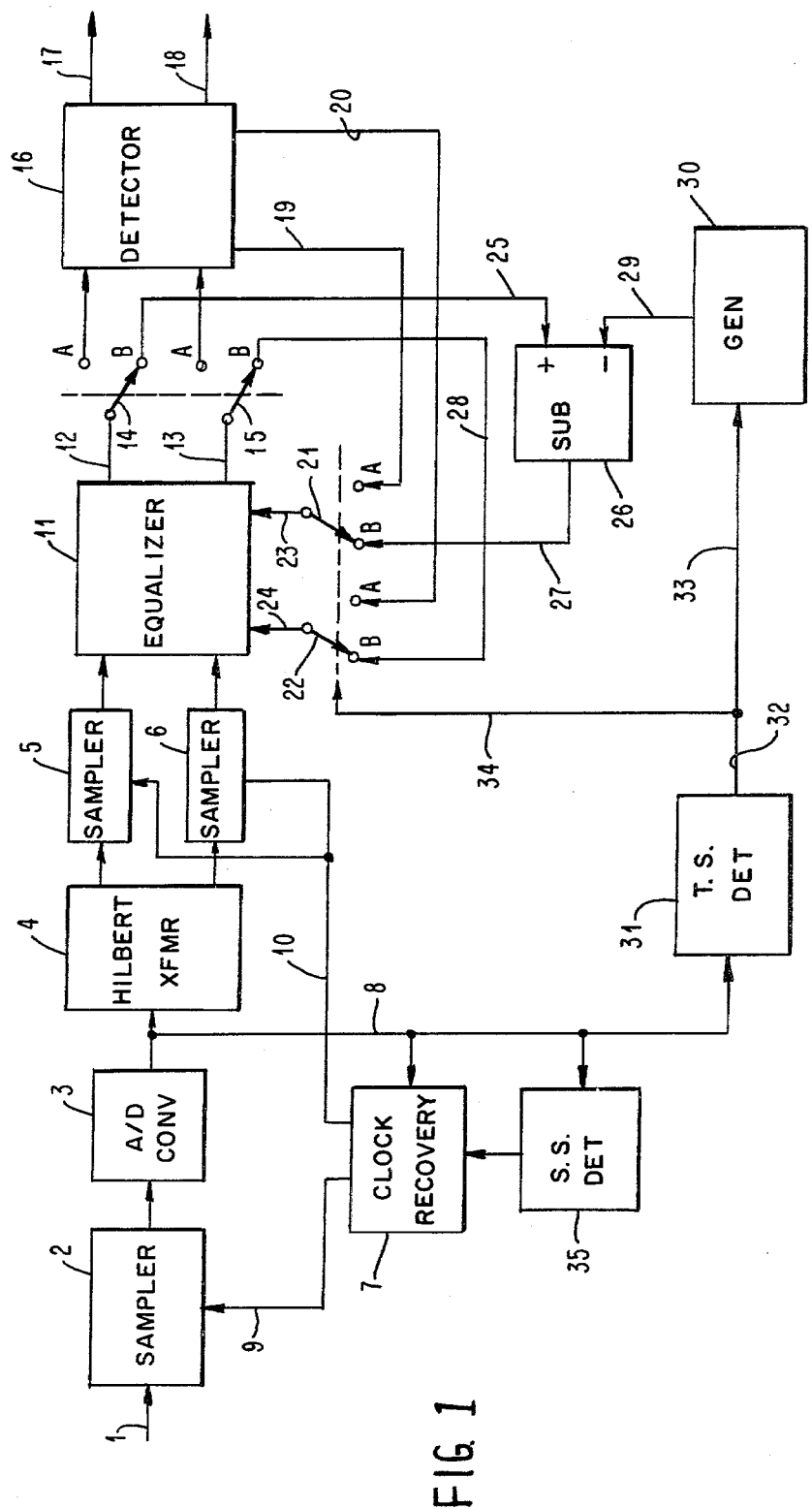
FIG. 1 is a block diagram of a DSB-QC receiver incorporating the present invention.

To illustrate the context within which the invention finds application, a typical block diagram of a DSB-QC, 4800 bps receiver in accordance with said CCITT Recommendations and incorporating the sequence detector of the invention has been shown in FIG. 1. The signal received from the transmission channel and the energy of which has been normalized by an automatic gain control circuit (not shown), is applied via a line 1, after being passed through a bandpass filter (not shown) which rejects the out-of-band noise, to a sampling device 2 in which it is sampled at the rate $1/\tau$. The selected rate $1/\tau$ is equal to a multiple m/T of the signaling rate 1/T so as to provide a sufficient number of samples at the output of the device 2 to enable the received signal to be properly defined. The value of the amplitude of these samples is converted to digital form in an analog-to-digital converter 3 and inputted to a digital Hilbert transformer 4.

A Hilbert transformer is a two-output device which supplies the in-phase and quadrature components of an input signal applied thereto. An exemplary digital embodiment of such a device is described in an article entitled "Theory and Implementation of the Discrete Hilbert Transform," by L. R. Robiner and C. M. Rader, in Digital Signal Processing, IEEE Press, 1972.

The in-phase and quadrature components of the input signal applied to the Hilbert transformer 4 are respectively resampled at the signaling rate 1/T by two sampling devices 5 and 6. A clock recovery device 7 has its input connected via a line 8 to the output of the analog-to-digital converter 3 and controls the sampling device 2 via a line 9, the sampling devices 5 and 6 via a line 10, and all other components of the receiver via lines not shown. An exemplary embodiment of such a clock recovery device is described in French Pat. No. 75-14020 filed by the present applicant Apr. 25, 1975 French Pat. No. 2,309,089). The in-phase and quadrature components, respectively, provided at the outputs of the sampling devices 5 and 6, of the demodulated signal are applied to the inputs of an adaptive complex transversal equalizer 11, an exemplary embodiment of which is described in French Pat. No. 73-26404 filed by the present applicant July 12, 1973 (French Pat. No. 2,237,379).

The in-phase and quadrature components of the equalized signal are respectively applied via lines 12 and 13 to the common input of a pair of two-position switches 14 and 15. Positions A of these switches are connected to the inputs of a data detection system 16 which provides on its output lines 17 and 18 the in-phase and quadrature components, respectively, of the detected data symbols. The system 16 also supplies on its output lines 19 and 20 the in-phase and quadrature components of an error signal representative of the difference between the components of the equalized signal and those of the detected data symbol corresponding thereto. An exemplary embodiment of a data detection system is described in U.S. Pat. No. 4,024,342. Lines 19 and 20 are respectively connected to positions A of a pair of two-position switches 21 and 22 whose outputs are respectively connected to the equalizer 11 via lines 23 and 24. Position B of the switch 14 is connected via a line 25 to the (+) input of a subtractor 26 which has its output connected to position B of the switch 21 via a line 27. Position B of the switch 15 is connected via a line 28 to position B of the switch 22. The (−) input of the subtractor 26 is connected via a line 29 to the output of a generator 30 of reference training sequences. This generator will be described in detail with reference to FIG. 4.

Line 8 is also connected to the input of a training sequence detector 31. This device is a sequence detector in accordance with the invention and will be described in detail with reference to FIGS. 2 and 3. The output 32 of the generator 31 is connected to the generator 30 via a line 33, to the switches 21 and 22 via a line 34, and to the switches 14 and 15 via a line not shown.

A synchronizing sequence detector 35 has its input connected to the line 8 and its output connected to the clock recovery device 7. An exemplary embodiment of such a detector is described in the *IBM Technical Disclosure Bulletin*, Vol. 18, No. 8, January 1976, pp. 2546–2547.

In the data mode of operation the switches 14, 15, 21 and 22 are all set to position A. The received signal whose in-phase and quadrature components are respectively available at the outputs of the sampling devices 5 and 6, is equalized in the equalizer 11, and its in-phase and quadrature components are then applied to the data detection system 16 though the switches 14 and 15, both of which are set to position A. At each signaling instant, the detection system 16 provides the components of the detected symbol on output lines 17 and 18 and the components of the error signal on output lines 19 and 20. The latter components are applied through the switches 21 and 22, both of which are set to position A, to the equalizer 11 which derives therefrom the control signals serving to adjust its coefficients.

During the turn-on period, the receiver is first provided with the synchronizing sequence. This sequence is detected by the synchronizing sequence detector 35 which controls, in particular, the synchronization of the clock recovery device 7 as described in detail in the aforementioned U.S. Pat. No. 4,039,748. The receiver then receives the training sequence the beginning of which is detected by the training sequence detector 31, which causes the switches 14, 15, 21 and 22 to be set to position B and initiates the generation of the reference training sequence by the generator 30 which sequentially provides the symbols comprised in the reference sequence at the signaling rate.

The generator 30 should simultaneously provide the inphase and quadrature components of each of the symbols in the reference sequence. These components should be respectively subtracted from the in-phase and quadrature components of the equalized signal to provide in-phase and quadrature components of the error signal applied to the equalizer 11. However, the reference sequence recommended by the CCITT is such that all of the symbols therein have a quadrature component equal to zero. Consequently, in the receiver shown in FIG. 1, at each signaling instant the in-phase component of the error signal applied to the equalizer 11 is supplied by the subtractor 26 which subtracts the in-phase component of the reference symbol received via line 29 from the in-phase component of the equalized signal received via line 25, and the quadrature component of the error signal is provided by the quadrature component of the equalized signal applied to the equalizer 11 via the line 28 and the switch 22, which is set to position B.

In order that the invention be better appreciated, the manner in which the inventive method may be used to detect the training sequence will now be described.

The turn-on sequence prescribed by CCITT Recommendations V27 bis and V27 ter comprises a synchronizing sequence, consisting of successive carrier phase changes of 180°, followed by an equalizer training sequence consisting of pseudo-random carrier phase changes of 0° and 180°. The training sequence is derived from a pseudo-random binary sequence generated by the polynomial $$1+x^{-6}+x^{-7}$$

Whenever the binary sequence contains a binary "0" the phase of the carrier undergoes a change of 0°, and whenever it contains a binary "1", the phase of the carrier undergoes a change of 180°. Also, the binary sequence begins with the binary configuration 0111110, corresponding to phase changes of 0°, 180°, 180°, 180°, 180°, 180°, 0°. The first phase change of 0° creates a reversal of the phase of the components of the synchronizing sequence frequency spectrum, and the detector of the present invention makes use of this phase reversal to detect the beginning of the training sequence.

The synchronizing sequence has a frequency spectrum consisting of two lines respectively located at frequencies $f_1$ and $f_2$ defined as $$f_1 = f_c - \tfrac{1}{2}T \quad f_2 = f_c + \tfrac{1}{2}T \tag{1}$$

where
  $f_c$ is the carrier frequency, and
  $1/T$ is the signaling rate.
The phase reversal initiated by the beginning of the training sequence results in a reversal of the phase of the components at $f_1$ and $f_2$ of the synchronizing sequence.

In accordance with the present invention, this phase reversal is detected by means of a signal S of frequency $1/T$ that is reconstructed from the components at $f_1$ and $f_2$ of the received signal. The reversal of the phase of the components at $f_1$ and $f_2$ causes the energy of signal S to drop. This can be determined by measuring the energy of the signal S, thereby providing a means that is both accurate and insensitive to noise to detect the training sequence. A detection device in accordance with a first aspect of the present invention will now be described with reference to FIG. 2.

The received signal available at the output of the analog-to-digital converter 3 is inputted via line 8 (FIG. 1) to a pair of narrow-band filters 40 and 41 respectively centered at the frequencies $f_1$ and $f_2$ defined earlier. The filter 40 provides at its outputs 42 and 43 the in-phase and quadrature components, respectively, of the component at $f_1$ of the received signal. The filter 41 supplies at its outputs 44 and 45 the in-phase and quadrature components, respectively, of the component at $f_2$ of that signal. These two filters are similar and are described in detail in the aforementioned French Pat. No. 2,309,089. The outputs 42 and 44 are connected to the inputs of a multiplier 46, the outputs 43 and 45 are connected to the input of a multiplier 47, the outputs 42 and 45 are connected to the inputs of a multiplier 48, and the outputs 43 and 44 are connected to the inputs of a multiplier 49. The outputs from the multipliers 46 and 47 are added together in an adder 50. The output from the multiplier 49 is subtracted from the output of the multiplier 48 in a subtractor 51.

At the sampling instants $k\tau$, $1/\tau = m/T$, signals of the following form are provided by the filter 40 on its output lines 42 and 43, respectively:

$$s_1 = A_1 \cos (2\pi f_1 k\tau + \phi_1) \quad (2)$$

$$s_1' = A_1 \sin (2\pi f_1 k\tau + \phi_1) \quad (3)$$

Similarly, signals of the following form are provided by the filter 41 on its output lines 44 and 45, respectively:

$$s_2 = A_2 \cos (2\pi f_2 k\tau + \phi_2) \quad (4)$$

$$s_2' = A_2 \sin (2\pi f_2 k\tau + \phi_2) \quad (5)$$

Signals of the following form are then obtained, respectively, at the outputs of the adder 50 and the subtractor 51:

$$s = A \cos (2\pi (f_2 - f_1) k\tau + \phi_2 - \phi_1) \quad (6)$$

$$s' = A \sin (2\pi (f_2 - f_1) k\tau + \phi_2 - \phi_1) \quad (7)$$

According to relations (1), relations (6) and (7) may be written as $$s = A \cos (2\pi/T \, k\tau + \phi_2 - \phi_1) \quad (8)$$

$$s' = A \sin (2\pi/T \, k\tau + \phi_2 - \phi_1) \quad (9)$$

Note that the signals s and s' are the in-phase and quadrature components, respectively, of a signal S whose frequency is equal to the signaling rate $1/T$.

The signals s and s' are sampled at the signaling rate $1/T$ in the sampling devices 52 and 53, respectively. The output from the device 52 is applied to the two inputs of a multiplier 54, and that from the device 53 is applied to the two inputs of a multiplier 55. The outputs from the multipliers 54 and 55 are summed in an adder 56 which provides at its output the energy E of the signal S. As long as the signal being received consists of the synchronizing sequence, the energy E fluctuates about a constant value designated $E_o$ and drops well below $E_o$ when the phase reversal takes place, i.e., at the beginning of the training sequence.

In accordance with a first aspect of the invention, the beginning of the training sequence is determined by detecting the drop in the value of the energy E.

Several means are available to detect this energy drop. For example, one may detect the time at which the energy reaches its minimum value or at which it has dropped by a predetermined amount.

Figure 2:
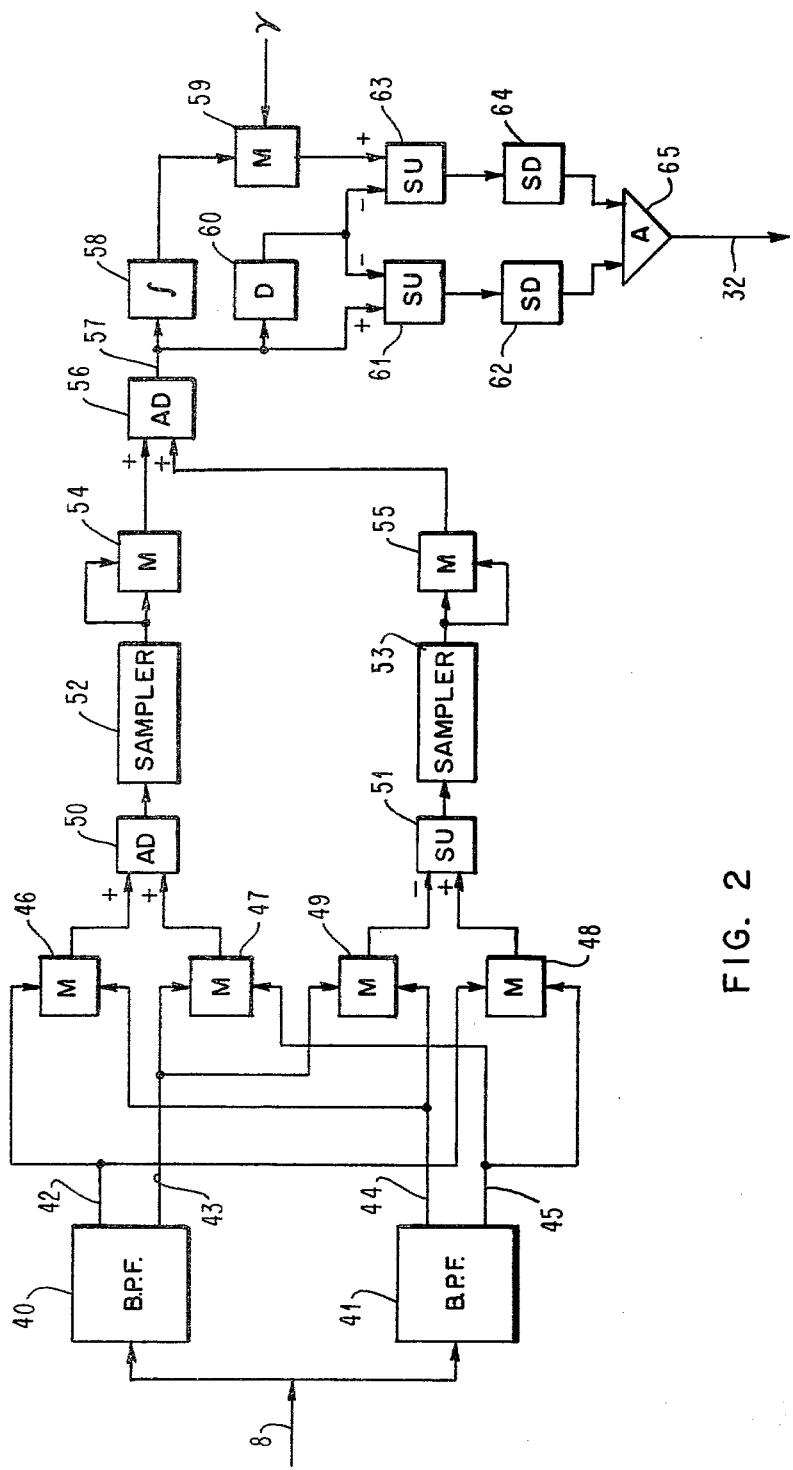
FIG. 2 shows a first embodiment of a sequence detector in accordance with the invention.

In the exemplary embodiment illustrated in FIG. 2, the energy drop is detected when the energy reaches its minimum value.

If the energy of the signal S at the signaling instants nT and (n−1)T is designated as E(nT) and E[(n−1)T], it will be deemed to have reached its minimum value when the two conditions below are satisfied:

$$E[(n-1)T] < \gamma E_o \quad (10)$$

and $$E(nT) > E[(n-1)T] \quad (11)$$

where $\gamma$ is a weighting factor whose value ranges from 0 to 1 and is equal, for example, to 0.5.

In FIG. 2, the energy obtained at the output of the adder 56 is applied via a line 57 to the input of an integrator 58 which provides the value of the energy $E_o$. The energy $E_o$ is multiplied by the factor $\gamma$ in a multiplier 59. The output from the adder 56 is also applied to the input of a delay element 60 which introduces a T-sec. delay. If the energy at the input of the element 60 is designated as E(nT), the energy obtained at its output will be E[(n−1)T]. The input and the output of the element 60 are respectively connected to the (+) and (−) inputs of a subtractor 61 which supplies the quantity $$E(nT) - E[(n-1)T]$$

A sign determining device 62 connected to the output of the subtractor 61 provides a high output if the quantity $$E(nT) = E[(n-1)T]$$

is positive, that is, if the condition defined by the relation (11) is satisfied.

The output of the delay element 60 is also connected to the (−) input of a subtractor 63 which has its (+) input connected to the output of the multiplier 59. A sign determining device 64 connected to the output of the subtractor 63 provides a high output if the quantity $$\gamma \, E_o - E[(n-1)T]$$

is positive, that is, if the condition defined by the relation (10) is satisfied. The outputs from the devices 62 and 64 are applied to an AND gate 65 which provides a high output on the line 32 (FIG. 1) when the two conditions defined by relations (10) and (11) are satisfied. The occurrence of this high output is indicative of the time at which the training sequence begins.

As has been seen, the reversal of the phase of the components at $f_1$ and $f_2$ causes the energy of the signal S to drop. However, this reversal also causes a drop in the amplitude of the in-phase component of that signal. The in-phase component s of the signal S takes the form given by relation (8), which is repeated below for convenience:

$$s = A \cos (2\pi/T \, k\tau + \phi_2 - \phi_1) \quad (8)$$

So long as the signal being received consists of the synchronizing sequence, thhe quantity $\phi_2 - \phi_1$ tends to zero, as described in the aforementioned French Pat. No. 75-14020, and the amplitude of the component s, sampled at the signaling rate $1/T$, increases continuously. When the phase reversal occurs, the amplitude of the component s drops suddenly.

In accordance with a second aspect of the present invention, the beginning of the training sequence is determined by detecting the drop in the amplitude of the component s. As stated earlier, several means are available to detect the drop in the energy E.

Similarly, various means may be used to detect the drop in the amplitude of the component s. In the exemplary embodiment shown in FIG. 3, the amplitude drop is detected when the amplitude becomes less than a fraction of its maximum value.

If the amplitude of the component s at the signaling instants nT and (n−1) is designated s(nT) and s[(n−1)T], respectively, the amplitude of s will be considered to be less than a fraction of its maximum value $s_m$ when the following condition is satisfied:

$$s(nT) < \beta s_m \qquad (12)$$

where $\beta$ is a factor whose value is less than 1 and equal, for example, to 0.5.

Figure 3:
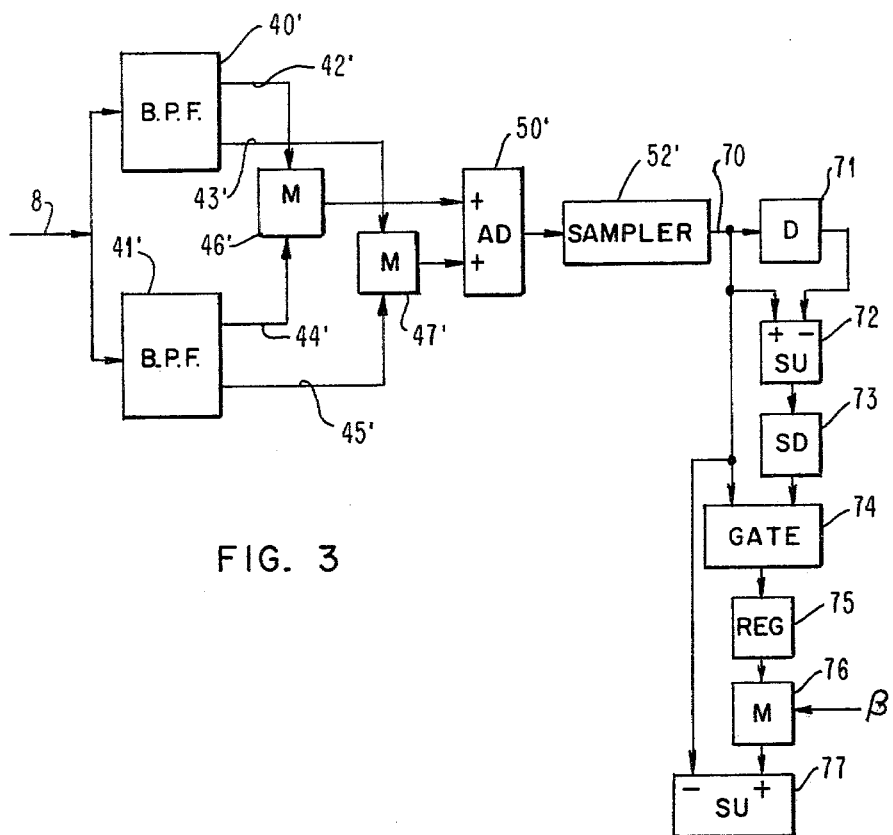
FIG. 3 shows another embodiment of a sequence detector in accordance with the invention.

This leads to the use of the simplified sequence detector shown in FIG. 3. The detectors of FIGS. 2 and 3 include several identical elements. These are indicated by the same reference numerals in both figures, but are distinguished by means of primes (') in FIG. 3.

The signal available at the output of the analog-to-digital converter 3 is fed via line 8 (FIG. 1) to the input of the bandpass filters 40' and 41' centered at frequencies $f_1$ and $f_2$, respectively. The filter 40' provides on its two output lines 42' and 43' the in-phase and quadrature components of the component at $f_1$ of the received signal. The filter 41' provides on its two output lines 44' and 45' the in-phase and quadrature components of the components at $f_2$ of this signal. The output present on line 42' is multiplied by the output present on line 44' in a multiplier 46'. The output on line 43' is multiplied by the output on line 45' in a multiplier 47'. The outputs from the multipliers 46' and 47' are summed in an adder 50'. The in-phase component s of the signal S is obtained at the output of the adder 50', as has been seen. The signal s is sampled at the signaling rate 1/T in the sampling device 52'.

The sampled signal s is applied via a line 70 to the input of a delay element 71 which introduces a T-sec. delay. If this signal is designated s(nT), the signal s[(n−1)T] will be obtained at the output of the element 71. The input and the output of the element 71 are respectively connected to the (+) and (−) inputs of a subtractor 72 which provides as its output the quantity s(nT)−s[(n−1)T].

A sign determining device 73 connected to the output of the subtractor 72 provides a high output if the quantity $$s(nT) - s[(n-1)T]$$

is positive, that is, if the amplitude of the signal s increases.

The sampled signal s is also applied to an input of a gate 74, the other input of which is connected to the output of the device 73. The output of the gate 74 is connected to a register 75 which has its output connected to an input of a multiplier 76, the other input of which receives the value $\beta$. The output of the multiplier 76 is connected to the (+) input of a subtractor 77, the (−) input of which is connected to the line 70. The output of the subtractor 77 is connected to a sign determining device 78 which has its output connected to the line 32 (FIG. 1).

If the amplitude of the signal s increases, the output of the sign determining device 73 goes high. This enables the gate 74, which passes the value of s(nT) to the register 75 to be stored therein.

As long as the amplitude of the signal s keeps increasing, the gate 74 remains open and the contents of the register 75 are updated by the successive increases in the amplitude of that signal. At the time the amplitude stops increasing, the register 75 contains the maximum value, $s_m$, of this amplitude. As the amplitude of the signal s decreases, the gate 74 is blocked, so that the value $s_m$ remains in the register 75. The value $s_m$ is multiplied by $\beta$ in the multiplier 76, which, therefore, supplies the quantity $\beta s_m$.

The subtractor 77 supplies the quantity $\beta s_m - s(nT)$. If this quantity is positive, that is, if the condition (12) is satisfied, the output of the device 78 goes high, which is indicative of the time at which the training sequence begins.

Figure 4:
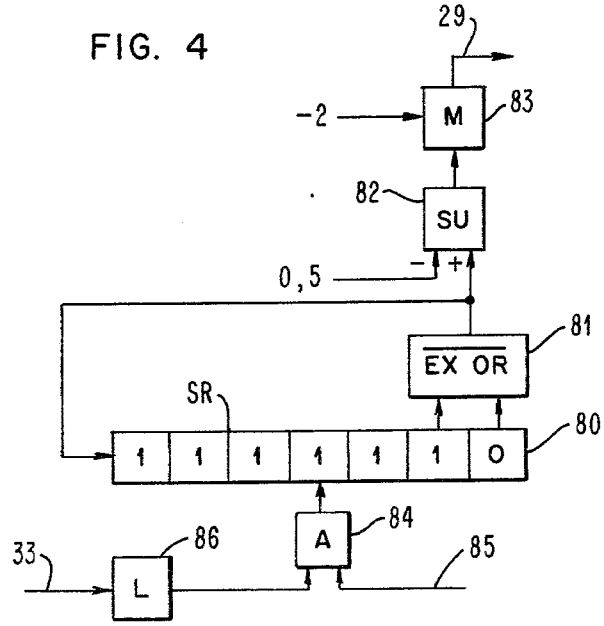
FIG. 4 shows an exemplary embodiment of a generator of reference sequences.

Referring now to FIG. 4, an exemplary embodiment of the reference sequence generator 30 of FIG. 1 is shown. The generator shown in FIG. 4 is in accordance with CCITT Recommendations V27 bis and V27 ter and includes a seven-stage shift register 80. The outputs of the sixth and seventh stages are connected to the inputs of an inverted Exclusive OR circuit 81 which has its output connected to the input of the first stage of the shift register 80, and also to the (+) input of a subtractor 82, the (−) input of which receives the binary coded value 0.5. The output of the subtractor 82 is connected to an input of a multiplier 83, the other input of which receives the binary coded value −2. The output of the multiplier 83 is connected to the line 29 (FIG. 1). The generator of FIG. 4 also includes an AND gate 84, an input of which receives via a line 85 pulses generated at the signaling rate 1/T by the clock recovery device 7. The other input of the AND gate 84 is connected to the output of a latch 86, the input of which is connected to the line 33 (FIG. 1). The output from the AND gate 84 controls the operation of the shift register 80.

In operation, the bit configuration 1111110 shown in the figure is first loaded into the shift register 80. This can be done, for example, under the control of the synchronizing sequence detector 35. When the beginning of the training sequence is detected, an up level appears on the line 33, as has been seen. This sets the latch 86, the output of which enables the AND gate 84, so that the timing pulses present of the line 85 are applied as shift pulses to the register 80. Whenever a "0" bit appears at the output of the inverted Exclusive OR circuit 81, the generator 30 must provide the symbol whose in-phase and quadrature components are 1 and 0 and which corresponds to a phase change of 0°. Whenever a "1" bit is obtained at the output of the circuit 81, the generator 30 must provide the symbol whose components are −1 and 0 and which corresponds to a phase change of 180°. This is done by means of the subtractor 82 and the multiplier 83. The 0 components of the symbols are ignored, as explained earlier in connection with FIG. 1. If a "0" bit appears at the output of the circuit 81, the value 0.5 is subtracted therefrom in the subtractor 82, which consequently supplies the value −0.5. The latter value is multiplied by −2 in the multiplier 83, which thus supplies the value 1 representing the in-phase component of the reference sequence symbol. It will be seen that if a "1" bit appears at the output of the circuit 81, the value −1 will be obtained at the output of the multiplier 83.

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desire to secure by Letters Patent is:

1. In a receiver used in a data transmission system employing double sideband-quadrature carrier modulation and wherein the transmitter generates a first sequence of successive carrier phase changes of 180° taking place at the signaling rate 1/T, followed by a second sequence of pseudo-random carrier phase changes of 0° and 180°, with the first of these being a 0° phase change, a method of detecting the beginning of said second sequence, characterized in that it includes the steps of:
 (a) filtering the received signal to extract therefrom a first signal of frequency $f_1$ and a second signal of frequency $f_2$, said frequencies $f_1$ and $f_2$ being defined as $$f_1 = f_c - \tfrac{1}{2}T \quad f_2 = f_c + \tfrac{1}{2}T$$

wherein $f_c$ is the carrier frequency,
 (b) combining said first and second signals to generate a third signal of frequency 1/T,
 (c) measuring the energy of said first signal, and
 (d) detecting the time at which said energy drops below its average value, said time being indicative of the time at which said second sequence begins.

2. A method according to claim 1, characterized in that the time at which the energy of said third signal drops is the time at which said energy reaches its minimum value.

3. In a receiver used in a data transmission system employing double sideband-quadrature carrier modulation and wherein the transmitter generates a first sequence of successive carrier phase changes of 180° taking place at the signaling rate 1/T, followed by a second sequence of pseudo-random carrier phase changes of 0° and 180°, with the first of these being a 0° phase change, a method of detecting the beginning of said second sequence, characterized in that it includes the steps of:
 (a) filtering the received signal to extract therefrom a first signal of frequency $f_1$ and a second signal of frequency $f_2$, said frequencies $f_1$ and $f_2$ being defined as $$f_1 = f_c - \tfrac{1}{2}T \quad f_2 = f_c + \tfrac{1}{2}T$$

where $f_c$ is the carrier frequency,
 (b) combining said first and second signals to generate the in-phase component of a third signal of frequency 1/T,
 (c) sampling said in-phase component at the signaling rate 1/T, and
 (d) detecting the time at which the amplitude of said sampled in-phase component decreases significantly, said time being indicative of the time at which said second sequence begins.

4. A method according to claim 3, characterized in that the time at which said amplitude decreases is the time at which that amplitude becomes less than a fraction of its maximum value.

5. In a receiver used in a data transmission system employing double sideband-quadrature carrier modulation and wherein the transmitter generates a first sequence of successive carrier phase changes of 180° taking place at the signaling rate 1/T, followed by a second sequence of pseudo-random carrier phase changes of 0° and 180°, with the first of these being a 0° phase change, a circuit for detecting the beginning of said second sequence, characterized in that it includes:
 a first filter for extracting from the received signal a first signal of frequency $f_1$ defined as $f_1 = f_c - \tfrac{1}{2}T$ where $f_c$ is the carrier frequency,
 a second filter for extracting from the received signal a second signal of frequency $f_2$ defined as $f_2 = f_c + \tfrac{1}{2}T$
 means for generating from said first and second signals a third signal of frequency 1/T,
 means for measuring the energy of said third signal, and
 detection means for detecting the time at which said energy drops below its average value, said time being indicative of the time at which said second sequence begins.

6. In a receiver used in a data transmission system employing double sideband-quadrature carrier modulation and wherein the transmitter generates a first sequence of successive carrier phase changes of 180° taking place at the signaling rate 1/T, followed by a second frequency of pseudo-random carrier phase changes of 0° and 180°, with the first of these being a 0° phase change, a circuit for detecting the beginning of said second sequence, characterized in that it includes:
 a first filter responsive to the received signal for extracting from the received signal a first signal of frequency $f_1$ defined as $f_1 = f_c - \tfrac{1}{2}T$ where $f_c$ is the carrier frequency, said first filter having two outputs at which the in-phase and quadrature components of said first signal are respectively available,
 a second filter responsive to the received signal for extracting from the received signal a second signal of frequency $f_2$ defined as $f_2 = f_c + \tfrac{1}{2}T$, said second filter having two outputs at which the in-phase and quadrature components of said second signal are respectively available,
 means connected to the first and second filters for generating from the in-phase and quadrature components of said first and second signals provided thereby the
 in-phase and quadrature components of a third signal of frequency 1/T and providing a said third signal indicative thereof,
 means for measuring the energy of said third signal and providing a fourth signal indicative thereof, and
 detection means responsive to said fourth signal for detecting the time at which said energy drops below its average value, said time being indicative of the time at which said second sequence begins.

7. A device according to claim 6, characterized in that said means for measuring the energy of said third signal includes:
 a first multiplier for multiplying the in-phase component of said third signal by itself,
 a second multiplier for multiplying the quadrature component of said third signal by itself, and
 means for summing the outputs from said first and second multipliers.

8. A device according to claim 6 or 7, characterized in that said detection means detects the time at which said energy reaches its minimum value, said time being indicative of the time at which said second sequence begins.

9. In a receiver used in a data transmission system employing double sideband-quadrature carrier modulation and wherein the transmitter generates a first sequence of successive carrier phase changes of 180° taking place at the signaling rate 1/T, followed by a second sequence of pseudo-random carrier phase changes of 0° and 180°, with the first of these being a 0° phase change, a circuit for detecting the beginning of said second sequence, characterized in that it includes:

- a first filter responsive to the received signal for extracting from the received signal a first signal of frequency $f_1$ defined as $f_1 = f_c - \frac{1}{2}T$ where $f_c$ is the carrier frequency, said first filter having two outputs at which the in-phase and quadrature components of said first signal are respectively available,
- a second filter responsive to the received signal for extracting from the received signal a second signal of frequency $f_2$ defined as $f_2 = f_c + \frac{1}{2}T$ said second filter having two outputs at which the in-phase and quadrature components of said second signal are respectively available,
- means responsive to the first and second filters for generating from the in-phase and quadrature components of said first and second signals the in-phase component of a third signal of frequency 1/T and providing a said third signal indicative thereof,
- means for sampling said in-phase component of said third signal at the signaling rate 1/T, and
- detection means responsive to the sampled third signal for detecting the time at which the amplitude of said sampled in-phase component decreases significantly, said time being indicative of the time at which said second sequence begins.

10. A device according to claim 9, characterized in that said detection means detects the time at which said amplitude becomes less than a fraction of its maximum value, said time being indicative of the time at which said second sequence begins.

* * * * *